Dec. 9, 1969  E. V. MITCHELL  3,482,325
GAUGE FOR POSITIONING DRILLS RELATIVE TO A GRINDING WHEEL
Filed Feb. 2, 1967  2 Sheets-Sheet 1

INVENTOR
Ebb V. Mitchell

BY *Strauch, Nolan, Neale, Nies & Kurz*

ATTORNEYS

INVENTOR
Ebb V. Mitchell

BY Strauch Nolan Neale Nies & Kurz
ATTORNEYS

United States Patent Office 3,482,325
Patented Dec. 9, 1969

3,482,325
GAUGE FOR POSITIONING DRILLS RELATIVE TO A GRINDING WHEEL
Ebb V. Mitchell, P.O. Box 849, Midland, Tex. 79701
Filed Feb. 2, 1967, Ser. No. 613,624
Int. Cl. B27g 23/00; G01b 5/20
U.S. Cl. 33—185                                2 Claims

ABSTRACT OF THE DISCLOSURE

A gauge for positioning drill bits for dressing on a grinding wheel with a predetermined chisel point angle, the gauge having a surface adapted to contact the cutting edge on the bit along its length when the bit is properly positioned.

---

This invention relates to gauges and more particularly to gauges for positioning twist drill bits for dressing or grinding on a grinding wheel.

The gauge of the present invention has particular application to drill bit sharpening apparatus of the type disclosed and claimed in U.S. Patent 3,197,924. In this unit a drill bit is positioned in a chuck opposite the periphery of a grinding wheel. After the bit has been properly aligned the chuck is moved forward to dispose one cutting edge of the drill bit in contact with the wheel and the chuck is then swung about an essentially horizontal axis one or more times to complete the grinding of one cutting edge on the drill. The drill is then rotated 180° about its axis and the opposite cutting edge is ground.

It is extremely important that the chisel point angle be ground correctly within very close limits to permit the drill to function effectively, to avoid excessive wear or breakage and to adapt the drill for use with materials of widely varying hardness. While a variety of devices are available for positioning the twist drill bit for grinding, these devices are universally characterized by complexity and high cost and usually can be operated only by a highly skilled or especially trained operator.

It is a primary purpose and object of the present invention to provide improved gauges for positioning twist drill bits for grinding, the gauges being capable of producing a high degree of accuracy and being characterized by a simplicity and low cost heretofore unobtainable.

It is a further object of the present invention to provide novel gauges for positioning twist drill bits for grinding which can be used by an unskilled or untrained mechanic quickly and easily to produce unusually accurate results.

Additional objects and advantages will become apparent as the description proceeds in connection with the accompanying drawings in which.

Figure 1:
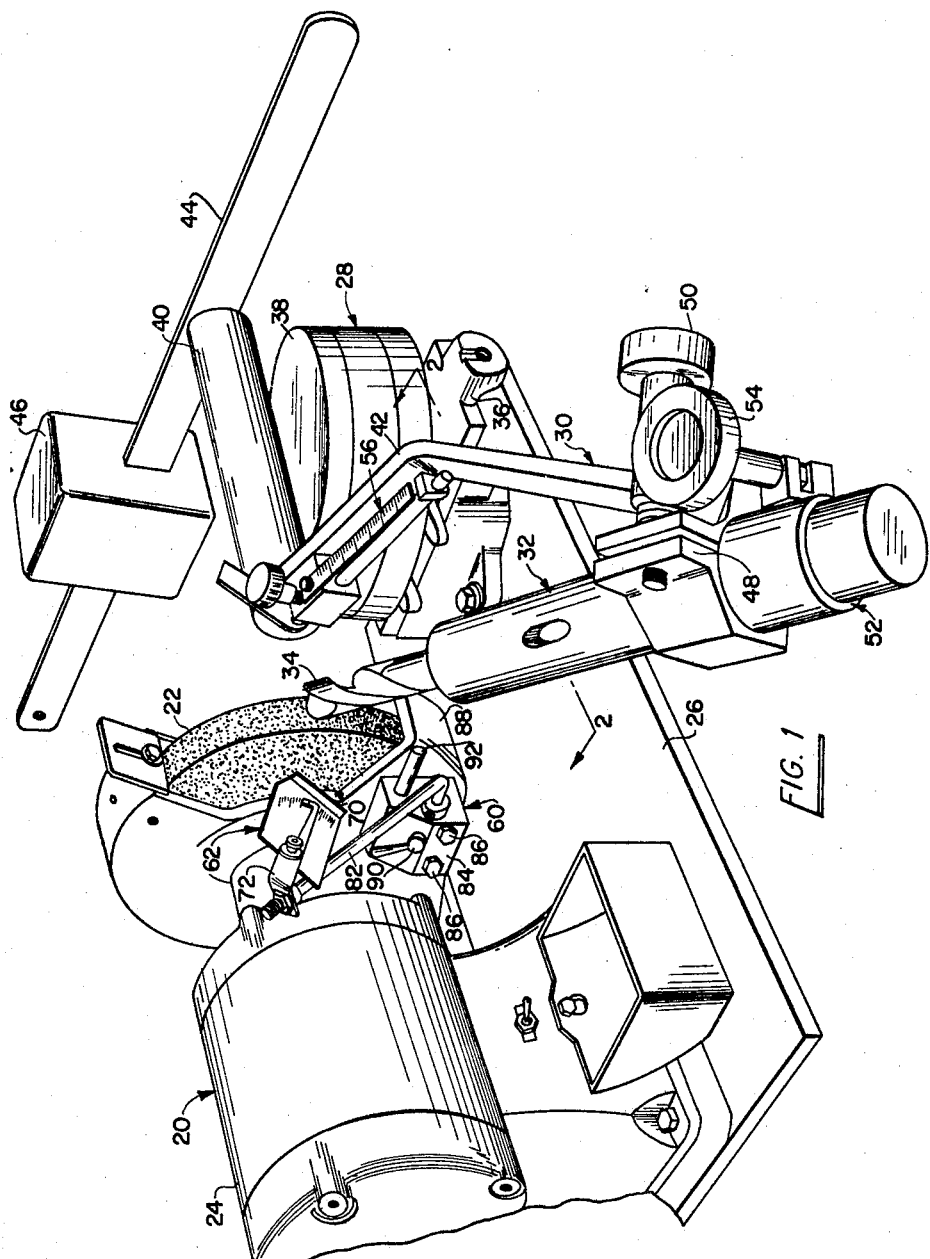
FIGURE 1 is a perspective view showing the gauge of the present invention installed in a twist drill grinding apparatus.

Referring now more particularly to the drawings, the grinding apparatus with which the gauge of the present invention is used includes a grinder 20 of conventional construction having a wheel 22 driven by an electric motor 24, the assembly being mounted on a base 26. The base 26 also supports a turret assembly 28 carrying an arm assembly 30 supporting a chuck 32 in which the drill bit 34 to be sharpened is releasably carried.

The turret assembly 28 is mounted for bodily movement in a direction normal to the axis of the wheel 22 by a slide mechanism indicated generally at 36. The upper portion 38 of the turret, which is mounted for rotation with respect to the base of the turret about an essentially vertical axis, carries a sleeve 40 which journals a pin not shown rigidly connected to the arm 42 of the chuck support assembly 40. The opposite end of the pin carries a lever 44 carrying a counterweight 46 to provide for balanced operation.

The chuck 32, which is of conventional construction, has a cylindrical outer periphery and is slideably received in a clamp collar 48 carried by the end of the arm 42. When the adjusting nut 50 is loosened, the chuck 32 may be freely rotated or shifted axially within the collar assembly 48. When the adjusting nut 50 is tightened the chuck 32 is securely held in any position. A second clamp collar assembly 52 is carried by the chuck 32 outwardly of the collar assembly 48. When the adjusting nut 54 of the assembly 48 is loosened the collar may be moved to any axial or rotated position on the chuck 32 and when the nut is tightened the collar assembly is rigidly locked to the chuck.

As more fully explained in the aforesaid United States Patent 3,197,924, the adjacent faces of the collars 48 and 54 are provided with co-operating stops (not shown) to permit the chuck 32 to be rotated between positions exactly 180° apart when the adjusting nut 50 is loosened to permit grinding the two opposite cutting edges of the bit.

When it is desired to sharpen a bit, such as that indicated at 34, the bit is inserted into the chuck 32 in random location. With the collars 48 and 52 loosened, the chuck 32 is located in the proper axial position as determined by the gauge assembly indicated generally at 56 and the inclination of the axis of the drill bit with respect to the axis of the grinding wheel 22 is adjusted by appropriate operation of the turret assembly 28. These operations and the mechanism for performing them form no part of the present invention.

Before the drill bit can be dressed properly it is necessary to set the chisel point angle which can be varied by rotation of the drill bit 34 about its axis. The present invention is concerned with the gauge assembly indicated generally at 60 which permits the chisel point angle to be established rapidly and accurately by an unskilled operator.

Essentially, the gauge assembly comprises a workpiece contacting gauge member 62 together with support means for accurately adjusting the position of the gauge member and for moving it between operative and inoperative positions. The gauge member preferably comprises a flat metal scale plate 64 carrying suitable indicia, such as an angle scale 66 typically reading from approximately 90 to 150°. The scale plate 64 is suitably secured, as by tack welding, to a backup sheet 68 provided at its lower edge which with a flange 70, the under surface of which is adapted to contact a cutting edge of the drill bit. The gauge member 62 is pivotally secured to a fixed pointer 72 by a post having an enlarged cylindrical portion 74 fitting within a cylindrical opening in the pointer 72, the post having a threaded end 76 for the reception of a nut 78 which releaseably clamps a washer 79 against the face of the pointer 72. This construction assures that the gauge member 68 will move accurately about an arc established by the center of the cylindrical post portion 74.

The upper end of the pointer 72 is adjustably attached by nuts 80 to the upper threaded end of a support arm 82, the lower horizontal end of which is journalled in a block 84 rigidly secured, as by bolts 86, to the wheel guard 88. The arm 82 is freely rotatable and may be locked in any desired position by operation of a locking arm 90.

Figure 2:
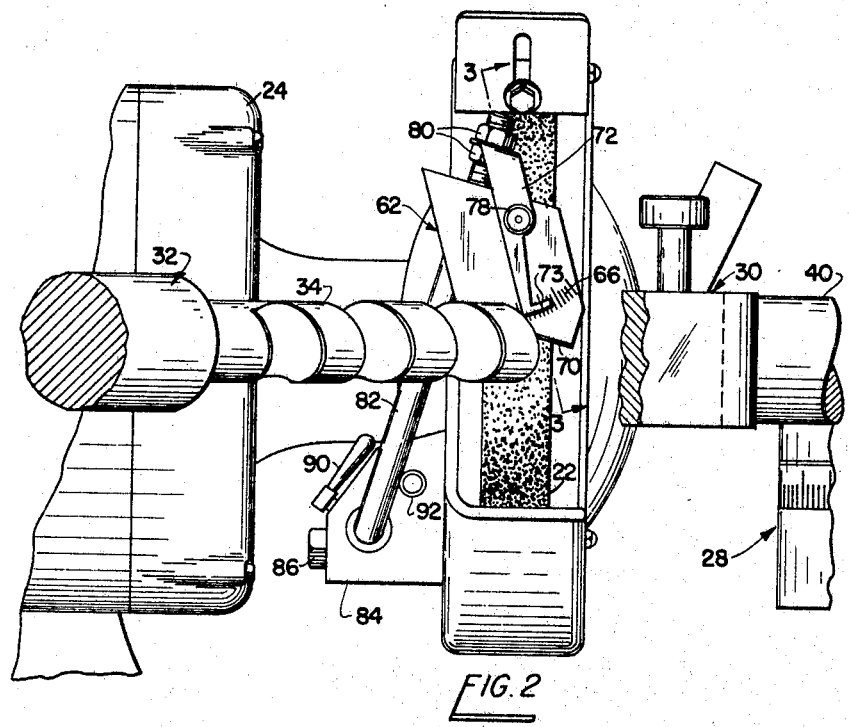
FIGURE 2 is an enlarged front elevation of the gauge.
Figure 3:
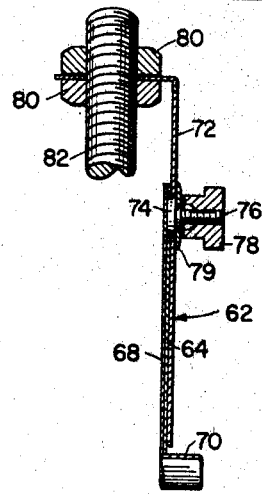
FIGURE 3 is a vertical section taken along line 3—3 of FIGURE 2.

In FIGURE 1 the gauge is shown in its inactive position which it normally occupies. The active position of the unit shown in FIGURE 2 is determined by a stop rod 92 projecting from the adjacent face of the mounting block 60. When the arm 82 is swung against this stop the position and inclination of the pointer 72 is established within a very close limit. Accordingly, when the index mark 73 provided on the pointer is aligned with any particular angle marking on the gauge member 62 the inclination of the gauge surface 70 is similarly located with a high degree of accuracy.

After the drill bit 34 has been securely positioned in the chuck, its proper angular position has been established by operation of the turret assembly 28 and its axial position has been established by sliding the chuck within the collar 48 the gauge assembly is moved from the inactive position of FIGURE 1 to the active position of FIGURE 2. The desired chisel point angle is set by aligning the appropriate angle mark of the indicia 66 with the index mark 73 on the pointer and the gauging surface is brought into contact with the cutting edge of the drill bit 34. The knob 50 is loosened to permit rotation of the chuck 34 to bring the cutting edge of the drill bit into contact along its entire length with the under surface of the flange 70. This final alignment need not be made visually since the cutting edge may be moved against the flange 70 which functions in the manner of a stop. With the parts in this position, the collar 48 is securely locked and the rotated position of the collar assembly 52 is adjusted. The drill bit is then in the exact position required to produce the desired chisel point angle in the subsequent grinding or dressing of the drill bit which is achieved by rocking the chuck about the axis of the journal 40 one or more times.

The invention may be embodied in other specific forms without departing from the spirit or essential characteristics thereof. The present embodiment is therefore to be considered in all respects as illustrative and not restrictive.

What is claimed and desired to be secured by Letters Patent is:

1. For use with a grinder assembly including a grinding wheel supported on a base for rotation about a fixed axis and a chuck for supporting a twist drill for grinding thereby, said chuck being supported on said base for movement about vertical and horizontal axes: a gauge assembly for positioning said drill to be ground with a predetermined chisel point angle, said gauge assembly comprising a gauge member having a surface adapted to contact a cutting edge of said drill along the length of said edge when said drill is properly positioned, means on said base independent of the chuck and the support therefor for positioning said gauge member to dispose said surface at any desired angle comprising an arm mounted on said base for pivotal movement about a fixed axis, support means pivotally mounting said gauge member on said arm, and cooperating means on said gauge member and said support means to permit visual determination of the angle of said surface.

2. For use with a grinder assembly including a grinding wheel supported on a base for rotation about a fixed axis and a chuck for supporting a twist drill for grinding thereby, said chuck being supported on said base for movement about vertical and horizontal axes: a gauge assembly for positioning said drill to be ground with a predetermined chisel point angle, said gauge assembly comprising a gauge member having a surface adapted to contact a cutting edge of said drill along the length of said edge when said drill is properly positioned, means on said base independent of the chuck and the support therefor for positioning said gauge member to dispose said surface at any desired angle comprising an arm mounted on said base for pivotal movement about a fixed axis between an inoperative position displaced away from said wheel and an operative position adjacent said wheel, stop means on said base against which said arm is adapted to be moved in said operative position, a pointer carried by the free end of said arm, said pointer having an index mark, means pivotally mounting said gauge member on said arm, said gauge member having an angle scale adapted to cooperate with said index mark to permit visual determination of the angle at which said surface is disposed.

References Cited
UNITED STATES PATENTS

| | | | |
|---|---|---|---|
| 467,857 | 1/1892 | Conradson | 33—185 |
| 1,095,338 | 5/1914 | Mallory | 51—219 X |
| 2,220,326 | 11/1940 | Haskell | 51—219 |
| 2,597,300 | 5/1952 | Cuff | 33—201 |
| 3,197,924 | 8/1965 | Mitchell | 51—219 |
| 3,359,690 | 12/1967 | McClellan | 51—219 |

WILLIAM D. MARTIN, JR., Primary Examiner

U.S. Cl. X.R.

33—201; 51—219